March 6, 1956  A. D. McDUFFIE  2,737,170
HIGH COMPRESSION COMBUSTION CHAMBERS
Filed Jan. 18, 1951  2 Sheets-Sheet 2

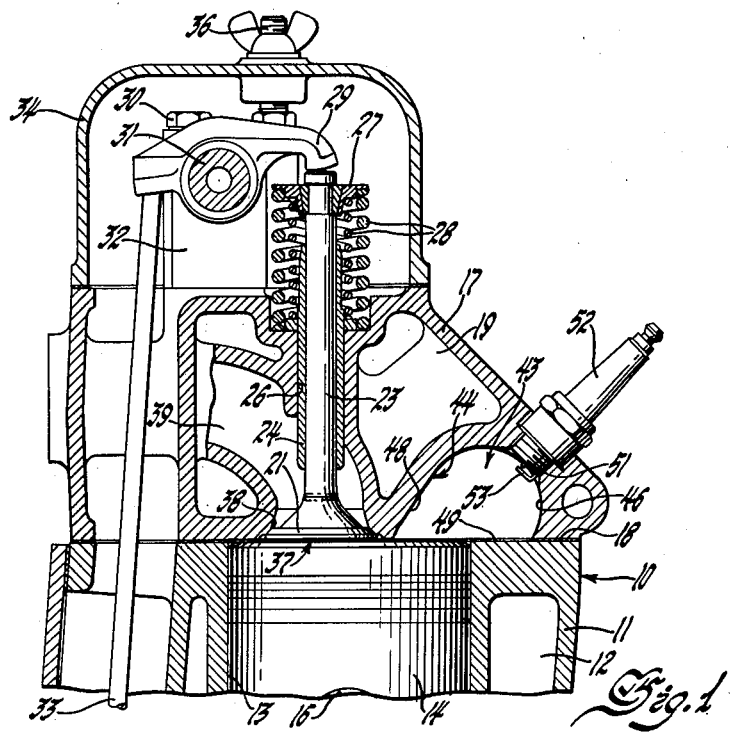
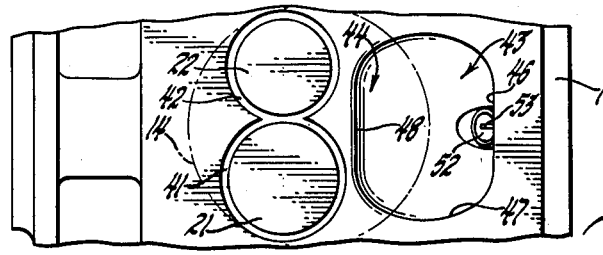
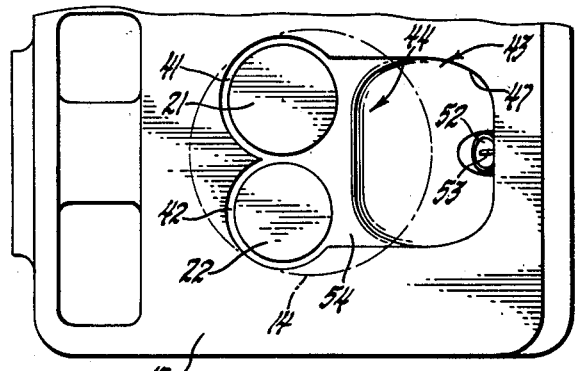

Inventor
Archie D. McDuffie
By Willits, Helmig & Baillio
Attorneys

United States Patent Office 2,737,170
Patented Mar. 6, 1956

2,737,170

HIGH COMPRESSION COMBUSTION CHAMBERS

Archie D. McDuffie, Berkley, Mich., assignor to General Motors Corporation, Detroit, Mich., a corporation of Delaware Application January 18, 1951, Serial No. 206,590

6 Claims. (Cl. 123—191)

This invention relates to internal combustion engines and has particular relation to combustion chambers in four-stroke cycle, spark ignited, internal combustion engines.

An object of the invention is to improve combustion chambers in such engines in a way that will make possible the employment of lower octane fuels at higher compression ratios, without objectionable detonation and throughout all engine operating conditions.

It has been determined that it is entirely possible to operate engines of this type up to compression ratios of 15 to 1 and that large increases in thermal efficiency can be obtained up to compression ratios of 12.5 to 1. Engine roughness can be prevented by increasing the rigidity of the engine, losses due to increased friction can be prevented by better bearings, lubrication, etc., and other problems that might tend to counteract gains otherwise obtainable from higher compression ratios can be solved. Anti-knock fuels capable of operating throughout the range of compression ratios up to 15 to 1 are now known and may become increasingly available commercially as processes of manufacturing these fuels improve.

Also it is known that the octane requirements of any engine can be considerably changed by changes in engine design. For example, the design of cooling systems, charge forming devices, valve mechanisms, ignition systems and other engine components may be changed in many ways to increase or to decrease detonation under certain conditions of operation of an engine. The octane value of fuels capable of operating without objectionable detonation throughout all engine operating conditions therefore may be changed by changes in the design of these components. Differences in the octane requirements of an engine which are caused by such changes in design are said to be measurable in mechanical octane numbers. These numbers may be employed to represent the numerical difference in the octane values of the various fuels which are required to operate engines which have been subjected to such changes.

One of the principal gains in mechanical octane numbers that it now appears possible to make in valve-in-head engines is in the design of combustion chambers. It is the purpose of this invention to provide engines having combustion chambers capable of operating without objectionable detonation on fuels of lower octane value and at higher compression ratios.

Without too greatly interfering with other design requirements, it is proposed to construct engine combustion chambers in which as large a part of a charge as is possible will be contained in a firing chamber part of the combustion chamber and as small a part as is possible will be contained in the clearance space or spaces comprising the remaining part or parts of the combustion chamber. The firing chamber should be concentrated as much as is possible, consistent with other requirements, around the spark plug of the engine so as to provide the shortest possible flame travel in all directions. Also, consistent with other requirements, the spark plug should be located in the combustion chamber in such manner as to provide the shortest possible flame travel across the firing chamber from the ignition terminals of the spark plug to the clearance space or spaces with which the firing chamber communicates. The clearance space or spaces should be constructed in such a way as to extend throughout a large area but to hold the minimum possible volume of charge. That is, the clearance space or spaces should be shallow and should provide only the minimum possible clearance for the operation of the valves and pistons. High turbulence is obtained by making the overlapping area of the head cover a relatively large area of the piston. Both the inlet and the exhaust valves may be located in the overlapping part of the head, if this is considered preferable, and to open directly into the cylinder, so that the induction and exhaust of fluid from the cylinder will not be interfered with. With the inlet and exhaust valves opening into the mechanical clearance space or quench area between the overlapping part of the head and the cylinder, it may be desirable to provide valve clearance spaces around the valves so that any possible interference with the flow of fluid through the valves may be reduced to a minimum. With the exhaust valve opening into the mechanical clearance space directly opposite the end surface of the piston, it will be apparent that the exhaust valve will be cooled by high loss of radiant heat to the piston. It is proposed in the firing chamber to burn the largest possible volume of the charge in the shortest possible time and by a flame that will extend over a widely extending front, but which flame will move across a minimum distance in reaching other parts of the charge not contained within the firing chamber. It is then proposed to burn the small and widely distributed part of the charge contained in the mechanical and valve clearance spaces with a flame having a wide but shallow flame front. With such a flame and in such constricted areas, it appears that the rate of flame travel is not sufficiently great to cause the excessive pressures which are thought to result in detonation. The closely adjacent metallic surfaces defining these spaces also appear to absorb a large part of the radiant heat from the flame and therefore prevent excessive temperatures in the small part of the charge contained in such spaces.

For a better understanding of the invention, reference now may be had to the accompanying drawing forming a part of the specification, in which:

Figure 1 is a vertical sectional view through the upper part of an engine having a combustion chamber embracing the principles of the invention.

Figure 2 is a fragmentary view of the engine head in which the combustion chamber is partly formed and which is employed in the structure disclosed by Figure 1. Figure 2 illustrates the combustion chamber as the combustion chamber will appear from the lower surface of the head.

Figure 3 is a view of an engine head similar to that illustrated by Figure 2 and illustrating a modified form of combustion chamber which may be used in the engine illustrated by Figure 1.

Figure 4:
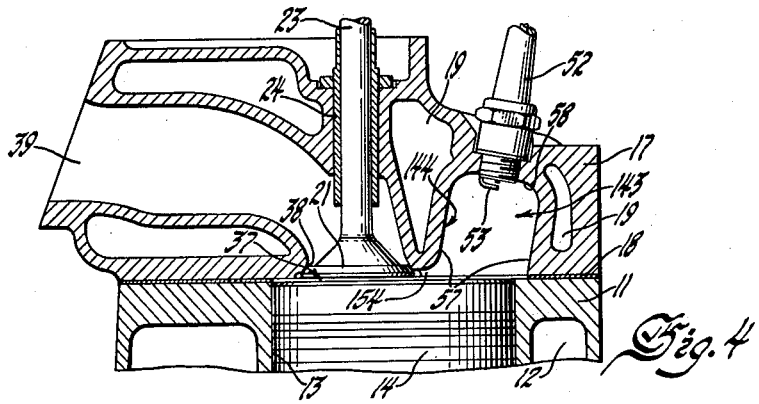
Figure 4 is a vertical sectional view through the upper part of an engine having another modified form of combustion chamber embracing the principles of the invention.

Referring particularly to Figures 1 and 2, there is employed in practicing the invention, a four-stroke cycle, spark ignition, internal combustion engine which is indicated generally by the numeral 10. The engine 10 comprises a cylinder block 11 having water cooling passages 12 formed therein and through which passages water is circulated to and from a suitable radiator for cooling the engine. The block 11 is formed in such a way as to provide one or more cylinders 13 in which pistons 14 are mounted for reciprocable movement upon wrist pin bearings indicated at 16. The head ends of the pistons 14 are flat and lie in planes perpendicular to the axes of the cylinders 13. The cylinders 13 are closed at the upper extremities thereof by a head 17 which is secured to the block 11 by bolts or other suitable means. A gasket 18 may be employed between the mating surfaces of the block 11 and the head 17 for the purpose of preventing leakage of fluid therebetween. The gasket 18 which is employed in the structure illustrated by Figure 1 may be assumed to have a thickness of about .070 of an inch.

The head 17 also is formed in such a way as to provide water cooling cavities 19 which like the cavities 12 in the block 11 are connected in the cooling system of the engine for the purpose of cooling the head 17 and the various mechanisms, passages, and chambers located therein. The head 17 also has inlet and exhaust valves 21 and 22 respectively mounted therein with the stems 23 of the valves slidably disposed in valve stem guides 24 which are secured in cylindrical openings 26 formed inwardly from the exterior surface of the head 17. The ends of the stems 23 beyond the head 17 have annular spring abutments 27 secured thereto and springs 28 are confined between the abutments 27 and the adjacent surface of the head 17 for resiliently holding the valves 21 and 22 in closed positions. The valves 21 and 22 are adapted to be operated by rocker arms 29 mounted on rocker shaft 31 which in turn is mounted in blocks 32 secured by bolts 30 to the upper surface of the head 17. The rocker arms 29 are operated in the usual manner by push rods 33 which are driven by the usual engine camshaft. The valve operating mechanism projecting above the head 17 may be enclosed in a cover 34 which may be secured to the head 17 by bolts indicated at 36.

It will be apparent that the mating surfaces of the head 17 and the block 11 are plane surfaces and that these surfaces are separated from one another throughout the entire extent thereof by a distance equal to the thickness of the gasket 18. It will also be apparent that the upper plane surface of the piston 14 forms practically a continuation of the upper plane surface of the block 11 when the piston is in its upper dead center position. The lower plane surface of the head 17 is constructed in such a way as to extend over a large part of the end of the cylinder 13, in such manner as to provide only a minimum of mechanical clearance space 37 between the adjacent overlapping surface of the head and the end of the piston 14. The overlapping parts of the head 17 and the piston 14 also may be described as the quench area of the engine cylinder structure and the mechanical clearance space 37, as the quench space.

The inlet and exhaust valves 21 and 22 preferably are constructed in such a way as to have plane surfaces on the inner end faces thereof. The valves 21 and 22, which close the inlet and exhaust ports for the engine, are adapted to be mounted in the engine head 17 in such manner that the plane end surfaces of the valves lie substantially in the plane and form a continuation of the plane surface of the head 17 which overlaps the cylinder 13 to provide the quench space and the mechanical clearance space indicated at 37. The inlet valve 21 is adapted to close an inlet port 38 which is formed at the end of an inlet passage 39 and by which a combustible mixture of fuel and air is supplied to the cylinder 13 when the inlet valve 21 is opened. The expanded products of combustion from the cylinder 13 are adapted to be discharged through an exhaust port and passage which are also formed in the head 17 and which are controlled by the exhaust valve 22. The inlet valve 21 is larger than the exhaust valve 22. Likewise the inlet port and passage for each cylinder 13 of the engine 10 is larger than the exhaust port and passage.

In order further to expedite the flow of gas to and from the inlet and exhaust passages of the engine and around the inlet and exhaust valves indicated respectively at 21 and 22, the head 17 is formed in such a way as to provide intersecting and annular clearance spaces 41 and 42 which extend into the overlapping and mating lower surface of the head to the extent of about .095 of an inch. These annular clearance spaces are made as narrow in width as they can be made without interfering with the flow of gas around the inlet and exhaust valves 21 and 22.

The combustion chamber 43 of the engine 10 is formed in such a way as to include the mechanical clearance space indicated at 37, the annular clearance spaces 41 and 42, and a firing chamber which is indicated by the numeral 44. It is proposed to construct the combustion chamber 43 in such a way that the mechanical clearance 37 and the valve clearances 41 and 42 will comprise large wall surface areas but a minimum portion of the total volume of the combustion chamber 43. The firing chamber 44 will comprise small wall surface areas but a maximum portion of the total volume of the combustion chamber 43. The firing chamber therefore is relatively compact. The clearance space is the opposite of compact. It is proposed to construct the combustion chamber 43 in such manner that the overlapping part of the head 17 will comprise a large part of the total area of the cylinder 13. For example, in an engine designed to operate at 9 to 1 compression ratio, it is proposed to have the overlapping part of the head 17 which forms the upper wall of the quench space of the engine, constitute about 80 percent of the total cross-sectional area of the cylinder 13, and to have the volume of the firing chamber 44 comprise about 95 percent of the total volume of the combustion chamber 43.

The firing chamber 44 is designed in such a way as to be as compact as possible, consistent with the space available for locating the firing chamber in the head. It is therefore formed by having the opposite walls thereof located in relatively closely spaced relation to one another. It is also important to have the wall of the firing chamber which is directly opposite the piston and the communicating space between the mechanical clearance or quench space 37 and the firing chamber 44, as close to one another as the two can be constructed without sacrificing too much in the way of the maximum possible compactness in the design of the firing chamber 44.

As will be seen from examining Figures 1 and 2, the firing chamber 44 therefore is designed to include a somewhat elongated cylindrical surface 46 having semi-ellipsoidal end surfaces 47, the latter having the major axes thereof extending transversely with respect to the axis of the cylindrical surface 46. One wall of the cylindrical surface 46 is tangently extended as is indicated at 48, in such way as to meet and to intersect the mechanical clearance space 37 a short distance away from the intersecting annular clearance spaces 41 and 42. Due to lack of available space for constructing the firing chamber 44 to meet all possible requirements, the cylindrical surface 46 also intersects the upper mating surface of the block 11 as is indicated at 49. The cylindrical wall 46 of the firing chamber 44 which is directly opposite the piston 14 and the communicating edge of the mechanical clearance space 37, has a relatively centrally disposed opening 51 formed therein in which a spark plug 52 or other suitable ignition device is adapted to be located. It will be apparent that such location of the spark plug 52 will place the ignition terminals 53 thereof just within and approximately at a central or middle location within the wall of the firing chamber 44 which is directly opposite the region where the firing chamber 44 communicates with the clearance space 37, and almost directly opposite the exposed surface of the piston 14. Being centrally located with respect to the elongated wall 46, the ignition terminals 53 therefor are located a minimum distance from the thin, elongated area where the firing chamber 44 communicates with the clearance space 37. It will be apparent that with smaller volumes involved in constructing combustion chambers with higher compression ratios, it will be possible to reduce the extent of the surface 49 where the firing chamber 44 overlaps the upper mating wall of the cylinder block 11.

In the modification shown by Figures 1 and 2, it will be apparent that the intersecting annular valve clearance spaces 41 and 42 do not open directly into the firing chamber 44 but communicate with the firing chamber beneath a relatively narrow ledge forming a part of the lower mating surface of the head 17 and through a part of the mechanical clearance space 37.

In the form of the invention shown by Figure 3, this part of the lower mating or overlapping surface of the head 17 is cut away in such a way as to provide a passage 54 for the direct communication of the intersecting annular clearance spaces 41 and 42 with the firing chamber 44. This passage is about the same depth as the depth of the intersecting annular valve clearance spaces 41 and 42 and merely provides a continuation of such clearance spaces into the lower part of the firing chamber 44. Except for the difference provided by the passage 54 the structure disclosed by Figure 3 is the same as that disclosed by Figures 1 and 2 and corresponding reference numerals therefor are applied to corresponding parts in all of the three figures.

In each of the structures shown by Figures 1 to 7 the relative positions of the cylinders 13, the combustion chambers 43, the valves 21 and 22 and the spark plugs 52, are shown by a circle indicated in dot-and-dash lines.

Figure 5:
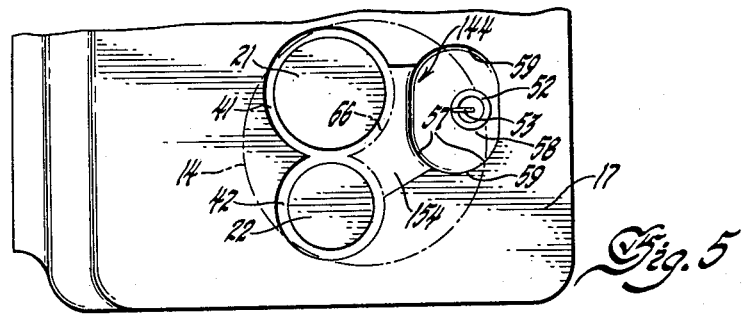
Figure 5 is a plan view from the lower surface of the head employed in the structure illustrated by Figure 4.

The engine structure shown by Figures 4 and 5 has a combustion chamber 143 which is similar to that included in the structure shown by Figures 1 and 2, except with respect to the shape and position of the firing chamber 144 and in the passage leading to the intersecting annular valve clearance spaces thereof. The other and corresponding parts of the structure shown by Figures 4 and 5 therefore are indicated by the reference numerals used in indicating the same parts in Figures 1 and 2.

In Figures 4 and 5, the walls of the firing chamber 144 are made somewhat differently so as to provide a slightly different ratio between compactness of the firing chamber and the distance from the spark plug terminal means to the shallow area where the firing chamber 144 communicates with the clearance space 37 and the valve clearance spaces 41 and 42. Pursuant to such ends, the side walls of the chamber 144 are formed by plane wall surfaces which are parallel to one another, as is indicated at 57. The top wall also is formed by a plane wall surface as indicated at 58, with the connecting surfaces between the top wall and side walls being arcuate and of considerable curvature in order not to form pockets or sharp corners adjacent the spark plug 52. The end walls 59 of the chamber 144 are more circular in cross-section than are the end walls 47 in the structures disclosed by Figures 1 to 3. Such semispherical end walls 59 in the structure shown by Figures 4 and 5 makes the firing chamber 144 somewhat more elongated in formation than the firing chambers in the structures disclosed by Figures 1 to 3. It will be apparent, however, that while the firing chamber 144 in the structure disclosed by Figures 4 and 5 is not quite so compact as the firing chambers 44 in the structures disclosed by Figures 1 to 3, it is nevertheless possible to arrange the spark plug 52 therein so that the terminals 53 thereof will be somewhat closer to the passage providing communication with the clearance space 37 and the valve clearance spaces 41 and 42.

Also in the structure disclosed by Figures 4 and 5, there is provided a passage indicated at 154 which is similar to the passage 54 in the structure illustrated by Figure 3. The passage 154 provides an area of direct communication between the firing chamber 144 and the valve clearance spaces 41 and 42 in the structure shown by Figures 4 and 5. The passage so indicated at 154 has a depth approximately equal to the depth of the valve clearance spaces 41 and 42.

Figure 6:
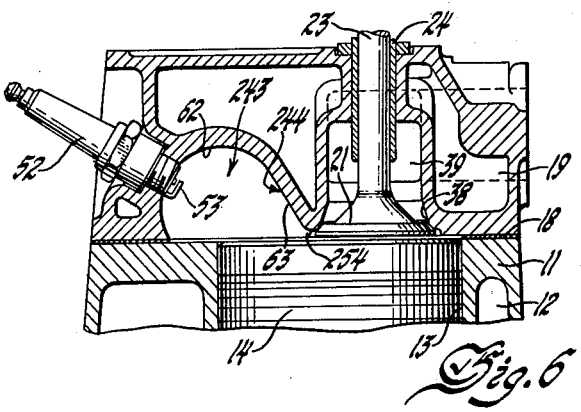
Figure 6 is a vertical sectional view of another engine having a modified form of combustion chamber embracing the principles of the invention.
Figure 7:
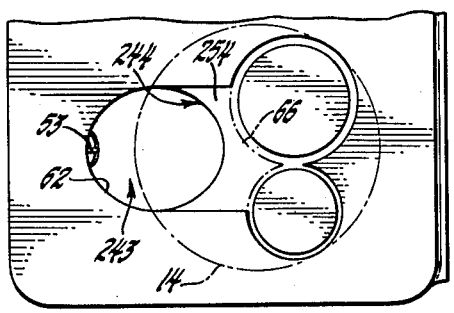
Figure 7 is a plan view of a portion of the engine head showing the modified form of combustion chamber illustrated by Figure 6.

The structure shown by Figures 6 and 7 is also similar to the structure shown by Figures 1 to 5 except in the respect that the firing chamber 244 is formed somewhat more compactly than the firing chambers in any of the preceding figures. Similar reference numerals therefore are applied to parts in Figures 6 and 7 that correspond to the parts in the preceding figures.

The firing chamber 244 of the combustion chamber 243, in the structure shown by Figures 6 and 7, is largely constructed at 62 in the shape of the surface of a sphere with a part of the surface indicated at 63 extending tangently toward the valve clearance spaces 41 and 42. A passage 254 having a depth approximately equal to the depth of the valve clearance spaces 41 and 42 extends between the valve clearance spaces and the lower part of the firing chamber 244. The spherical form of the firing chamber 244 provides a firing chamber of maximum compactness but when the spark plug 52 is placed in a wall of the firing chamber which is most remote from the communicating passage 254 then it will be apparent that the contacts 53 of the spark plug may be slightly farther away from the clearance space 37 and the annular valve clearance spaces 41 and 42, than it is in any of the preceding structures.

In the structures shown by Figures 4 to 6, it is apparent that it will be possible to eliminate the passages indicated by the numerals 154 and 254 and which passages provide somewhat enlarged communication passages between the firing chambers and the annular clearance spaces 41 and 42 surrounding the valves 21 and 22. The elimination of such passages may be brought about in accordance with the practice illustrated by Figures 1 and 2 where the communication between the valve clearance spaces and the firing chamber is through the mechanical clearance space indicated at 37. When such passages 154 and 254 are eliminated the communication between the firing chambers in Figures 4 to 7 and the annular valve clearance spaces 41 and 42 will be through the mechanical clearance space 37. The dot-and-dash lines indicated at 66 in Figures 5 and 7 indicate the limits of the valve clearance spaces 41 and 42 when the passages 154 and 254 are eliminated.

In operation all of the structures shown by Figures 1 to 7 of the drawing follow a similar pattern of performance. For example, in all of the structures a charge of fuel and air is drawn into a cylinder on the downstroke of the piston and upon the opening of the inlet valve of the cylinder. When the piston starts upwardly in the cylinder and the inlet valve has been closed, the charge is compressed by the piston into all of the several parts of the combustion chamber. Since the firing chamber is on one side of the cylinder and since the cylinder and piston are overlapped to a very large extent by the upper plane mating surface of the head, it will be apparent that there will be a very high velocity in the gas being displaced from the clearance spaces during the final movement of the piston. This high velocity of the gas being forced from between the overlapping part of the head and the piston will cause an extremely high turbulence in the firing chamber and this high turbulence will provide a highly atomized and homogeneous charge in the firing chamber when the burning of the charge in the combustion chamber commences. The ignition of the charge is initiated before the piston reaches top dead center and at the spark advance position or within a few degrees of the spark advance position at which the engine will develop maximum power. When the formation of the spark appears across the terminals of the spark plug, the spark heats the charge in the immediate vicinity of the terminals and after which the charge in such vicinity more or less spontaneously ignites. After such spontaneous ignition, the remaining parts of the charge in the firing chamber burn in all directions from the ignition terminals. Due to the compactness of the firing chambers disclosed by all of the figures of the drawing, the charges in all of the firing chambers burn across the firing chambers before the temperature and pressure of any part of the charge in the firing chambers are great enough to cause any of the unburned charge to detonate or to explode. While the pressures in the parts of a charge which are contained in the mechanical and valve clearance spaces of the engine tend to increase as a result of the burning of fuel in the firing chamber, such increases in pressure do not take place as rapidly as might otherwise occur, due to the fact that all of the surfaces involved are relatively close together. This closeness of surfaces appears to set up frictional resistance that tends to interfere with too rapid and too great a pressure rise in the clearance spaces. Also, the gas in these clearance spaces is not subject to the radiant heat from the full area of the flame front that travels across the firing chamber in all directions from the ignition terminals of the spark plug. It will be apparent that this radiant heat will be absorbed largely by the opposing surfaces of the firing chamber, the piston, and the cylinder end wall surfaces and will not greatly affect the heat in the clearance spaces until the flame has practically reached these spaces. Also the compressed gas in the clearance spaces referred to and particularly in the mechanical clearance space opposite the exhaust valve will not be subject to as great an increase in temperature from contact with the surface of the exhaust valve as might be possible under other circumstances. When the piston is at top dead center, the surface of the piston is very close to the exhaust valve, and consequently the exhaust valve will be cooled rapidly by heat radiated from the exhaust valve to the piston. As this heat is more widely distributed, there is less tendency to form a hot spot on the exhaust valve surface that might otherwise raise the temperature of the parts of the charge between the exhaust valve and the head of the piston.

It will be apparent that the combustion chamber is so designed as to promote very high rates of flame travel throughout the relatively short distances within the firing chamber and relatively low rates of flame travel throughout the greater distances and smaller quantities of mixture that are found per unit of distance in the mechanical and valve clearance spaces. The charge therefore will burn in too short a time in the firing chamber to cause detonation and at too slow a rate in the mechanical and valve clearance spaces to cause detonation.

Engines built to conform to the practices of this invention have been operated at various compression ratios much in excess of those now employed in engines for automobiles. Single cylinder engines have been built and dynamometer tested, multiple cylinder engines have been built and have been tested both on dynamometers and in automobiles. These tests have been made under all operating conditions under which engines are normally tested in laboratories and under all operating conditions to which engines normally are subjected in the operation of automobiles, and it has been found that if the engines are designed to withstand high compression ratios, material gains can be made in efficiency of operation. Also it has been found that material gains can be made in the octane requirements of engines operating at such high compression ratios. For example, it has been found that changes in design such as are emphasized in the structures disclosed by Figures 1 to 7 do decrease to a considerable extent the octane requirements of engines operating at compression ratios as high as 9 to 1. Numerous tests on the engines herein disclosed and on other engines operated under similar conditions show that improvements in octane requirements that are very considerable may be made. For example, engines of ordinary designs and operating at maximum power spark advance may require up to 100 octane gasoline in order to be operable at a 9 to 1 compression ratio under all conditions of load and speed, whereas engines of the same compression ratio and designed according to the principles embraced in the structures disclosed by Figures 1 to 7 may be operated under the same conditions without objectionable detonation and on fuels having octane ratings as low as 90.4 percent. At a spark advance resulting in a 1 percent power loss, which is the normal practice in operating internal combustion engines for automobiles, it has been found that even greater gains in mechanical octane numbers can be made. For example, engines constructed as automobile engines ordinarily are designed may require 95.9 octane gasoline for operation under such conditions, whereas engines designed according to the principles herein disclosed may operate on fuels having octane ratings as low as 78.5 percent.

There are certain differences between the engines disclosed by Figures 1 to 7 that make noticeable differences in the octane requirements of the engines. For example, in the structure disclosed by Figures 1 and 2, it will be apparent that the charge will burn in the firing chamber, then will burn across the mechanical clearance space separating the valve clearance space from the firing chamber, then through the valve clearance spaces, and thereafter across the remaining parts of the mechanical clearance space. Since the flame is required to burn through a relatively shallow passage before reaching the larger spaces provided by the clearance spaces around the valves, it appears that the flame may be cooled and its rate of travel may be decreased before reaching the valve clearance space, to such an extent that the part of the charge in the valve clearance space is not burned as soon as it might otherwise burn. The remaining parts of the charge being in the relatively shallow mechanical clearance space and being the last part of the charge to burn, also does not burn as soon as it might under other conditions. While this structure will operate on fuel having an extremely low octane rating and without detonation, there is however a certain sharp noise that may be distinguishable during the burning of the charge and this noise sounds very much like the noise accompanying detonation. However, this noise does not appear to result from detonation because it is not accompanied by the excessive temperatures and power losses resulting from detonation. This noise may be due to the fact that there appears to be a delayed burning of the charge in the valve clearance spaces and later in the mechanical clearance spaces around the valve clearance spaces and this may eventually result in a more rapid burning of the charge in these remaining and more isolated clearance spaces. This noise can be eliminated at some increase in octane requirement.

For example, in the structure disclosed by Figure 3 the valve clearance space is cut out toward the firing chamber of the engine in such a way as to provide a passage leading from the firing chamber. This passage is about the same depth as the valve clearance spaces. Such increases in the depth of the passage by which the valve clearance spaces communicate with the firing chamber apparently does not slow down the rate of flame travel to such a great extent before the flame reaches the valve clearance spaces and consequently the charge in the valve clearance spaces burns without such great interruption and more as a continuation of the burning of the charge in the firing chamber. The small amount of charge in the mechanical clearance space may thereafter burn as a continuation of the burning of the charge in the firing chamber and in the valve clearance spaces and passage leading thereto.

The structure disclosed by Figures 4 and 5 makes some sacrifice in the compactness of the firing chamber but it will be noted that this sacrifice makes possible a decrease in the distance between the ignition terminals of the spark plug and the part of the charge in the valve clearance spaces and in the mechanical clearance space. This apparently causes the part of the charge in the valve clearance spaces and in the mechanical clearance space to start burning in a shorter length of time after the burning commences in the firing chamber and consequently before the pressure rises to such a great extent in the valve clearance spaces and in the mechanical clearance space. It has been found that this variation or compromise decreases somewhat the octane requirement of an engine.

The structure disclosed by Figure 6 is the most compact of any of the firing chambers and therefore the charge in the firing chamber may burn in a shorter interval of time. However, it apears that the charge in the valve clearance spaces and in the mechanical clearance space may not commence to burn in such a short interval of time, and this may account for the fact that the octane requirement of fuels employed in this engine is somewhat greater than is required in the engines disclosed by Figures 1 to 5.

It is stated that the firing chamber has walls which are compactly related, that the firing chamber is compact, etc. By this is meant that the firing chamber which is most compact and which might have the most compactly related opposite walls would be one in which the maximum volume might be confined in a chamber having the minimum possible wall area. However, it will be noted from examining all of the firing chambers disclosed in Figures 1 to 7 the most compact firing chamber is generally not employed. This is done for practical reasons inasmuch as it has been hereinbefore stated that there are other design requirements that must be met in order to produce a combustion chamber embracing the principles of the invention. What is therefore meant by compactness and compactly related walls is that as much compactness is employed in designing the firing chamber as can be had, consistent with other design requirements. Compactness of the firing chamber has two advantages, namely, that the time required for burning the charge in the firing chamber will decrease as the compactness of the firing chamber increases and the heat rejection to the cooling water will decrease as the compactness of the firing chamber increases.

It will be apparent that all of the firing chambers in the structures disclosed by Figures 1–7 are relatively compact. The ignition terminals of the spark plugs therein are centrally located with respect to two or more oppositely disposed walls of the firing chambers, the total volume of the charges contained within the firing chambers is located at a minimum distance from the pistons and from the adjacent edges of the minimum clearance spaces between the adjacent surfaces of the pistons and the heads and valves, the firing chambers are located minimum distances from the edges of the valves, and the clearance spaces are formed principally by large oppositely disposed and equally spaced surface areas between the ends of the pistons and the opposed surfaces of the heads and valves.

For example, in Figure 1 the firing chamber 44 is mostly formed by the cylindrical surface 46 and the two semi-ellipsoidal end surfaces 47. The plane surface 48 tangently joins one edge of the cylindrical surface 46 to provide communication with the cylinder, thereby adding something to the volume of the firing chamber not included with the inherently compact form of the cylinder. The amount added, however, is approximately subtracted by the projection into the cylinder figure of the wall 49 forming a part of the upper wall of the cylinder block 11. However, it would be difficult to design a firing chamber of the required volume more compact in cross-section and more closely located with respect to the piston and the valves. It will be noted, however, that the firing chamber is longer than the diameter of the cylindrical surface 46. In view of the fact, however, that the ignition terminals of the spark plug 52 are centrally located with respect to the opposite ends of the cylindrical surface 46 and are placed just within the cylindrical surface 46, the firing chamber could be nearly twice as long as the diameter of the cylindrical surface 46 and still be compact in the respect that the flame travel distance to the opposite ends of the chamber would be no greater than the flame travel distance across a distance equal to the diameter of the cylindrical surface 46. It will be noted that the distance from the terminals 53 to any part of the firing chamber adjacent at the opposite ends thereof is not greater than the average distance to the surface of the piston 14. The spark plug terminals 53 could be located anywhere on a line representing a circumference of the cylindrical surface 46 or on the line extended therefrom along the surface 48 and the terminals 52 would not be substantially farther away from the opposite ends of the firing chamber 44 than from a diametrically opposite point on the inner surface of the firing chamber.

Figures 4 and 5 disclose a firing chamber which in cross section is substantially square, this being the next geometrical figure to a circle in enclosing the greatest possible area. The cross sectional configuration of the firing chamber 144, therefore, is relatively compact. Firing chamber 144 also could hardly be located more closely to the piston and valves of the engine without reducing the compactness referred to. Firing chamber 144, therefore, is located at a minimum distance from the piston and the valves of the engine. Since the spark plug terminals are located just within the walls of the firing chamber 144 and midway between the ends thereof and since the length of the firing chamber 144 is not so great as to render the flame travel distance to the opposite ends of the firing chamber substantially greater than the distance to the piston, it is apparent that the spark plug is centrally located with respect to the most distant parts of the firing chamber.

In Figures 6 and 7 the firing chamber 243 is disclosed as being formed by a hemi-spherical surface tangently extended toward the edges of the valves by a planular surface 63. A sphere is the most compact of all geometric figures so that it would not matter where the terminals of the spark plug were located with respect to the surfaces 62 and 63. The terminals of the plug would not be located a distance substantially greater from any oppositely disclosed part of the surface in any direction.

I claim:

1. A spark ignited internal combustion engine comprising a cylinder having a reciprocal piston therein and a minimum clearance space of relatively shallow and generally uniform depth between the adjacent surfaces of said piston and the head of said cylinder, inlet and exhaust valves in the head of said cylinder and opening into said clearance space in opposed relation to said piston, a firing chamber formed in said head and adjacent said piston and at the edges of and immediately adjacent said valves and in open communication with an edge of said clearance space adjacent said valves and extending directly beyond said cylinder, said firing chamber being formed by oppositely disposed walls merging with one another to provide a relatively compact cavity having the total volume thereof located immediately adjacent said piston and said edge of said clearance space and said valves and opening directly into said cylinder, a spark plug secured in one of said walls with the ignition terminals thereof projecting through said wall and into said firing chamber and being centrally located with respect to all of the oppositely disposed walls of said firing chamber and being disposed within a wall of said firing chamber opposite said piston and said valves and said edge of said clearance space, said ignition terminals being positioned in said chamber at a distance from said edge of said clearance space at least as great as the distance between said ignition terminals and any other wall surface of said chamber.

2. A spark ignited internal combustion engine as defined by claim 1 and in which said ignition terminals are positioned in said firing chamber so that the burning from said ignition terminals may proceed radially in all directions as a segment of a sphere having its center at said terminals and across said firing chamber to the side and end walls of said firing chamber before said flame front arrives at said edge of said clearance space.

3. A spark ignited internal combustion engine as defined by claim 1 and in which said firing chamber is elongated in one direction and has parallel side walls extending away from said piston and cylinder.

4. A spark ignited internal combustion engine as defined by claim 1 and in which said firing chamber is elongated in one direction and has parallel side walls extending in planes substantially parallel to a line between the centers of said valves.

5. A spark ignited internal combustion engine as defined by claim 1 and in which said valves are provided with annular valve clearance spaces around each valve and communicating with said minimum clearance space between the adjacent surfaces of said piston and the head of said cylinder.

6. A spark ignited internal combustion engine as defined by claim 1 and in which said valves are provided with annular valve clearance spaces around each valve and communicating with said minimum clearance space between said head and said piston and extending laterally across said head and into said firing chamber.

References Cited in the file of this patent

UNITED STATES PATENTS

| | | |
|---|---|---|
| 1,692,339 | Hill | Nov. 20, 1928 |
| 1,757,399 | Taub | May 6, 1930 |
| 1,812,197 | Bullington | June 30, 1931 |
| 1,835,302 | Horning | Dec. 8, 1931 |
| 2,003,311 | Ricardo | June 4, 1935 |
| 2,041,078 | Loeffler | May 19, 1936 |
| 2,089,577 | Sanders | Aug. 10, 1937 |

FOREIGN PATENTS

| | | |
|---|---|---|
| 57,368 | Denmark | Mar. 11, 1940 |